INVENTOR.
HENDRIK BREIMER
BY
Frank R. Trifari
AGENT

April 21, 1970 H. BREIMER 3,508,082

AMPLIFIER INCLUDING A DELAY LINE TO SHARPEN VIDEO PULSES

Filed May 18, 1967 2 Sheets-Sheet 2

INVENTOR.
HENDRIK BREIMER

BY

AGENT

United States Patent Office 3,508,082
Patented Apr. 21, 1970

3,508,082

AN AMPLIFIER INCLUDING A DELAY LINE TO SHARPEN VIDEO PULSES

Hendrik Breimer, Emmasingel, Netherlands, assignor, by mesne assignments, to U.S. Philips Corporation, New York, N.Y., a corporation of Delaware Filed May 18, 1967, Ser. No. 639,573
Claims priority, application Netherlands, June 11, 1966, 6608133
Int. Cl. H03k 5/01
U.S. Cl. 307—268 5 Claims

ABSTRACT OF THE DISCLOSURE

A circuit for enhancing a stepwise function of a wave comprises a delay line that is inductive between its input and a first output, and capacitive between its input and a second output. The short circuit output currents of the delay line are converted to voltages, for example in grounded base stages, and combined after one of them is inverted. The circuit may be used for aperture correction of television signals.

The invention relates to an arrangement including a delay circuit the impedance of which is inductive between a first input terminal and a first output terminal and is capacitative between the first input terminal and a second output terminal, a second input terminal and a third output terminal being connected to earth.

It is known to use such delay circuits for obtaining signals having a pulse function from signals having a step function. For this purpose, a delayed input signal may be subtracted from a stepwise input signal so that a pulsatory signal is obtained having a pulse duration dependent upon the delay time of the delay circuit. Alternatively, a pulsatory current may be obtained from a stepwise input signal by means of the differentiating effect of the capacitances in the delay circuit.

The invention provides a new possibility of using such a delay circuit and the arrangement in accordance with the invention is characterized in that means for converting a high frequency short-circuit current to voltage are connected respectively between the first or the second output terminal and the third output terminal, and in that, when a signal having a slightly stepwise function is applied through the characteristic impedance of the delay circuit to the input terminals, these means produce voltages which are superimposed on each other through a phase inverter and then supply a superimposition voltage having a more strongly pronounced step function.

The invention is based on recognition of the fact that, when a signal having a slightly stepwise function is applied to a delay circuit, this signal can be converted into a signal having a more strongly pronounced step function by the use of a combination of a single reflection and the current pulses in the capacitances of the delay circuit. For example, for radar or television purposes, a signal having a more or less sinusoidal function may be superimposed on a signal having a slightly stepwise function in order to obtain a more strongly pronounced step function.

The arrangement according to the invention may be utilized especially for aperture correction of video signals. In a television camera tube, the electron beam scanning the target plate will not convert a sharply defined boundary between various potentials in the potential image on the said target plate into a sharply defined step function but into a slightly stepwise function in the video signal supplied by the camera tube. This blurring effect is due to the fact that at the sharply defined boundary on the target plate, the finite cross section of the electron beam comprises both potential values so that an intermediate value is fixed in the video signal. It is known to convert by aperture correction of the video signal the slightly stepwise function to a more strongly pronounced step function more closely corresponding with the sharply defined boundary in the potential image on the target plate of the television camera tube. This has been described in the article "Aperture Compensation for Television Cameras" by R. C. Dennison, RCA Review, March 14, 1953, No. 1, pages 569–585.

The invention will now be described more fully with reference to the accompanying figures, of which:

Figure 1:
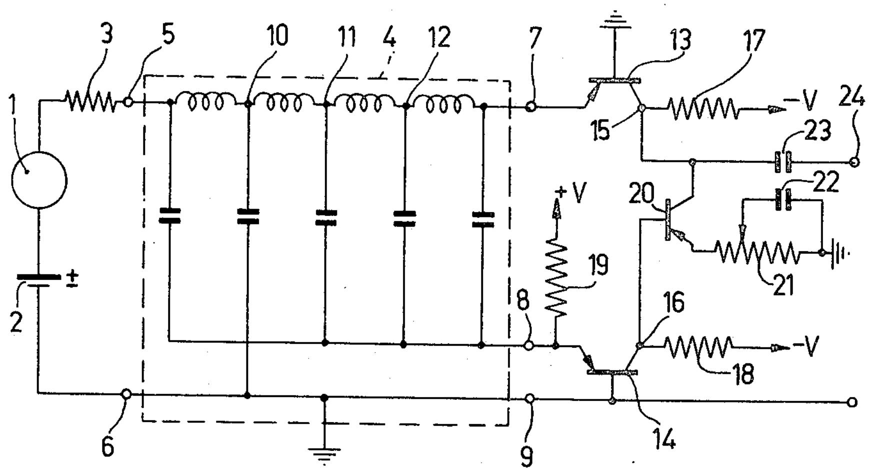
FIG. 1 shows an embodiment of the arrangement according to the invention.

Referring now to FIG. 1, reference numeral 1 denotes a signal source which supplies a voltage having a slightly stepwise function and which is connected in series with a bias-voltage supply source 2. The source 1 may be, for example, a television camera supplying a video signal. As will appear hereinafter, the bias voltage supplied by the source 2 serves to obtain a suitable adjusting point of a transistor. A terminal of the signal source 1 is connected to a first input terminal 5 of a delay circuit 4 through a resistor 3 the resistance value of which is equal to the characteristic resistance of the delay circuit 4. A terminal of the direct-voltage source 2 is connected to an earthed second input terminal 6. The delay circuit 4 is provided with three output terminals 7, 8 and 9. An inductive impedance between the first input terminal 5 and the first output terminal 7 is constituted by a few coils connected in series in the circuit 4. A capacitative impedance between the first input terminal 5 and the second output terminal 8 is constituted by a few capacitors. The output terminal 9 is connected to earth. The delay circuit 4 has points 10, 11 and 12 which are referred to inter alia in the description of FIG. 2. According to a feature of the invention, the point 10 is directly earthed through a capacitance. The output terminal 7 and the output terminal 8 are connected to the emitters of transistors 13 and 14, respectively, the bases of which are coupled to earth and the respective collectors 15 and 16 of which are connected through resistors 17 and 18, respectively, to a negative voltage terminal —V.

Direct-voltage source 2 supplies through resistor 3 and the delay circuit 4 between the emitter and the base of transistor 13 a bias voltage for obtaining a suitable adjusting point. For the same purpose, the emitter of transistor 14 is connected through a resistor 19 to a positive voltage terminal +V. The emitter of a transistor 20, the base of which is connected to the collector 16 of transistor 14, is earthed through a resistor 21 a variable part of which is bridged by a capacitor 22. The interconnected collectors of transistors 13 and 20 are connected through a coupling capacitor 23 to a terminal 24. According to the principle on which the invention is based, when signal source 1 supplies a voltage having a slightly stepwise function, a voltage having a more strongly pronounced step function will appear at the terminal 24.

The operation of the arrangement according to the invention will now be explained with reference to FIG. 2. A voltage having a slightly stepwise function supplied by signal source 1 is represented in FIG. 2*a*. This signal is superimposed on the bias voltage supplied by direct-voltage source 2 for driving transistor 13. The potential supplied by source 2 to resistor 3 is represented by a curve 30 and the superimposition potential of sources 1 and 2 is represented by a curve 31. The slightly stepwise variation between the two potentials is shown more or less diagrammatically by a curve 32. If the signal source 1 does not supply a voltage, a direct current supplied by the direct-voltage source 2 and associated with the adjusting point of transistor 13 flows through resistor 3, delay circuit 4 and transistor 13. This direct current results in a voltage drop across resistor 3, but not across the delay circuit 4 to be considered as substantially ideal. The voltage drop across the input impedance of transistor 13 is chosen to be very low so that the delay circuit 4 is substantially at zero potential.

Figure 2:
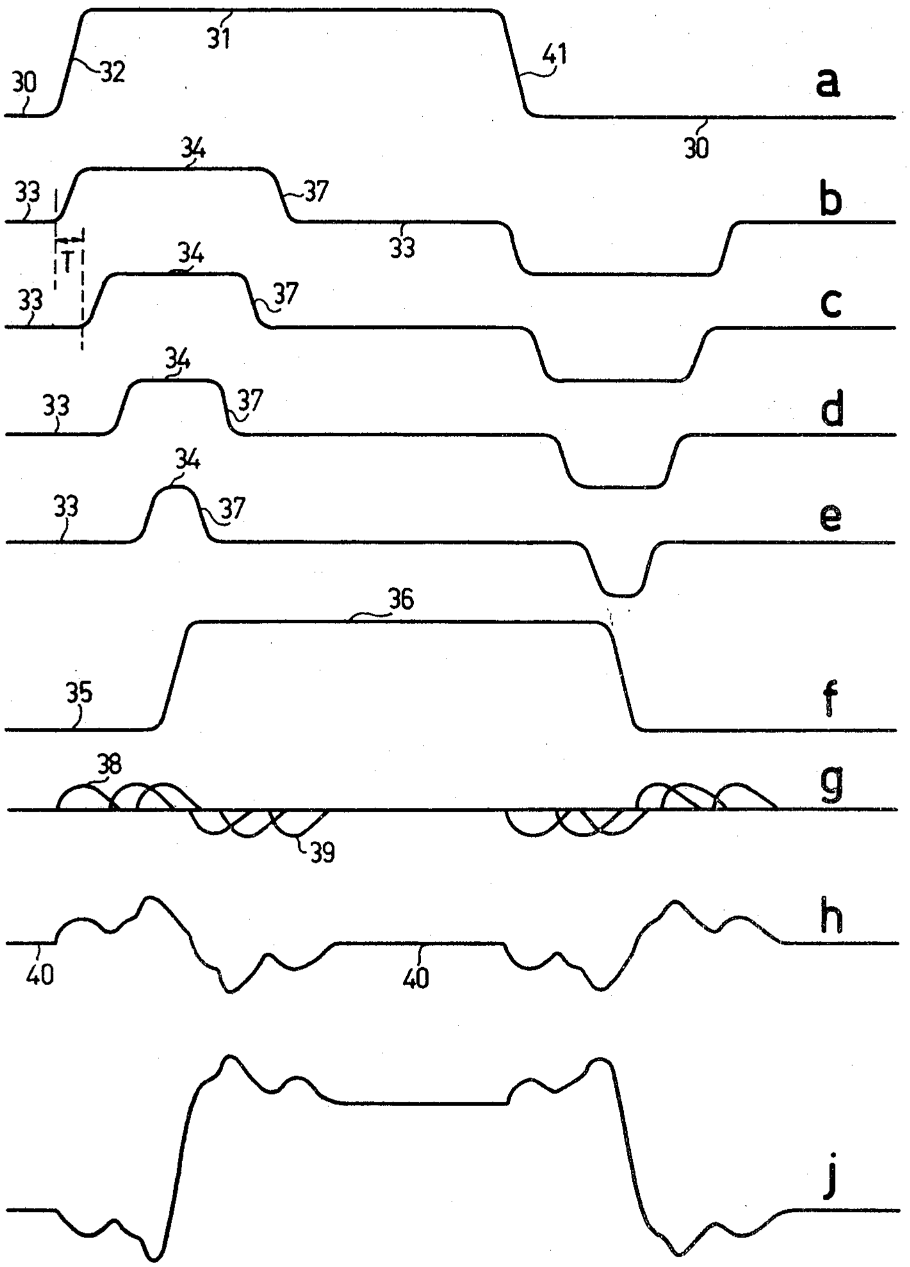
FIG. 2 shows a diagram for explaining the operation of the arrangement.

If signal source 1 supplies the voltage represented in FIG. 2*a*, only half the potential jump represented by curve 32 will be applied to the input terminals 5 and 6, since the resistance value of resistor 3 is equal to the characteristic resistance of delay circuit 4. The circuit 4, which is substantially at zero potential—which potential is represented in FIG. 2 by a curve 33—then obtains for point 5 the potential represented in FIG. 2*b* by a curve 34. The potential jump then propagates in the delay circuit 4. It is assumed that after a period of time T the potential jump arrives at point 10. As shown in FIG. 2*c*, without losses being taken into account, the potential at said point also increases by the same jump to the value represented by curve 34. This operation applied to points 11 and 12 is shown in FIGS. 2*d* and 2*e*. When the potential jump arrives at output terminal 7 which is earthed in effect due to the low input impedance of transistor 13, the potential jump in the positive going direction is reflected from terminal 7 as a potential jump in the reverse direction. The emitter current of transistor 13 has the same function as the voltage supplied by signal source 1 due to the shortcircuit with respect to earth. Since the emitter current is approximately equal to the collector current, a potential jump as shown in FIG. 2*f* will occur at point 15 of FIG. 1. Due to the increase of the collector current from the value associated with the adjusting point to the value resulting from the voltage supplied by signal source 1, the potential at point 15 increases from the value associated with curve 35 to the value associated with curve 36. When comparing FIGS. 2*a* and 2*f*, it is found that due to the sole effect of transistor 13, a potential occurs at terminal 15 which has the same, though delayed, function as the voltage supplied by signal source 1.

The reflected potential jump in reverse direction will arrive with a delay time T successively at points 12, 11, 10 and 5, as is represented in FIGS. 2*e*, *d*, *c* and *b* by the descending curve 37. After the occurrence of the reflected potential jump, these points are again at a potential which is substantially zero and which is represented by curve 33. When the potential jump arrives at resistor 3 in which it is completely absorbed, the voltage drop across resistor 3 is substantially equal to the voltage supplied by signal source 1.

In the foregoing, the influence of the potential jumps at the points 5, 10, 11 and 12 on the currents flowing through the capacitances connected to said points is left out of consideration. It is known that a voltage across a series-combination of a capacitance C and a resistor R varying more or less linearly with time causes a current to flow through said series-combination which approximately has the function $$\left(1-e^{-\frac{t}{RC}}\right)$$

For a low value of resistor R, the current will have reached its constant value already after a short time. If after a more or less linear variation the voltage is kept constant, the current having the aforementioned but now negative function again decreases. Due to the permanent inductances, however, the current will have a more or less smooth course. This current through the capacitance connected to the terminal 5 is represented by curves 38 and 39 in FIG. 2*g* while for said terminal 5 the potential jumps are shown in FIG. 2*b*. Current pulses 38 and 39 produce via the low input impedance of transistor 14 with respect to earth in the resistor 18 a collector current which results in a potential variation at point 16 which is equal to the current pulses 38 and 39. Potential jumps at points 11 and 12 produce in a similar manner the current pulses also shown in FIG. 2*g*. These current pulses are superimposed on each other and then cause a collector current to flow through the collector circuit of transistor 14, which current results in a potential variation at point 16 as shown in FIG. 2*h*. Curve 40 then corresponds with the potential at point 16 associated with the collector current flowing at the adjusting point of transistor 14.

If according to a feature of the invention, point 10 is directly earthed through a capacitance, this point cannot contribute to the emitter current of transistor 14. The effect of said step will be explained below.

The positive going potential variation at point 16 will cause a decrease of the collector current of transistor 20 due to the fact that said transistor is cut off. The resulting decrease of the voltage drop across resistor 17 causes a decrease in potential at point 15. The extent of this decrease can be adjusted according to a measure of the invention in that at least part of resistor 21 is A.C-short-circuited by capacitor 22. When the potential variation caused by transistor 14 (FIG. 2*h*) and inverted in phase by transistor 20 is superimposed on the potential supplied by transistor 13 (FIG. 2*f*), point 15 or terminal 24 obtains the potential represented in FIG. 2*j*. It is found that the signal shown in FIG. 2*a* having a slightly stepwise function is converted by means of the arrangement according to the invention to a signal shown in FIG. 2*j* having a more strongly pronounced step function.

The operation described for potential jump 32 also applies to potential jump 41 shown in FIG. 2*a*.

Accordling to a feature of the invention, the shape of the signal derived from the signal to be corrected by means of the capacitances is determined by providing at a given point of the delay circuit 4 a direct capacitative coupling between the first input terminal and earth. Thus, the potential jump at the point of the delay circuit 4 directly connected to earth will not contribute to the emitter current of transistor 14. It is clearly apparent from FIG. 2*h* that by a suitable choice of said point, the derived signal obtained can be influenced in a simple manner.

Especially when the arrangement according to the invention is utilized for aperture correction of a video-signal, it is desirable to form a signal having a local sagging. A signal having a slightly stepwise function can then be over-compensated without the contour then formed being too sharply defined and hence becoming disturbing. (Contour enhancement.)

It will be appreciated that the delay circuit 4 may either comprise a circuit arrangement consisting of coils and capacitors or a piece of coaxial cable. In the latter case, however, the sheath of the cable should be interrupted when a direct capacitative coupling is used.

It will also be evident that for adjusting the transistors 13 and 14, the base may be applied to a direct-voltage terminal and be insulated from earth for direct current by means of a large blocking capacitor. The blocking capacitor then earths the base for alternating current.

Moreover, it will be appreciated that the choice of pnp- or npn-transistors with the associated direct voltages is not essential to the principle of the invention.

Alternatively, the transistors may be replaced by tubes. Instead of the transistors 13 and 14, two tubes must then be used the control grids of which are earthed and the cathodes of which are connected to the terminals 7 and 8, respectively. By the use of negative feedback, the tube circuit may obtain a sufficient low input impedance. The transistor 20 may also be replaced by a tube the control grid of which is connected to point 16 and the anode of which is connected to point 15.

What is claimed is:

1. A circuit for enhancing stepwise variations of an input signal, comprising a delay line having an input terminal and first and second output terminals, whereby said line is inductive between said input terminal and said first output terminal and capacitive between said second output terminal and said input terminal, an input circuit connected to apply said signal between said input terminal and a point of reference potential, said input circuit having an impedance equal to the characteristic impedance of said line, first and second low impedance means connected between said first and second output terminals and said point of reference potential, means for converting the current through said first and second impedance means to first and second voltages, and inverting means for combining said first and second voltages with relative phase opposition.

2. The circuit of claim 1 in which said line is a lumped constant line having a plurality of inductive elements connected serially between said input terminal and said first output terminal forming junctions therebetween, and a plurality of capacitive elements connected between said second output terminal and at least some of the junctions of said inductive elements.

3. The circuit of claim 2, in which the junction of at least one pair of inductive elements is connected solely to an electrode of a capacitor, comprising means for connecting the other electrode of said capacitor to said point of reference potential.

4. The circuit of claim 1 in which said means converting said current comprises first and second transistors having their emitters connected to said first and second output terminals respectively, comprising means connecting the bases of said transistors to said point of reference potential, output impedance means connected to the collector of one of said transistors, and phase inverting means for applying the voltage at the collector of the other transistor to said output impedance means.

5. The circuit of claim 2 comprising a bias source for said first transistor connected in said input circuit.

References Cited

UNITED STATES PATENTS

| | | | |
|---|---|---|---|
| 2,503,909 | 4/1950 | Hollingsworth | 328—56 |
| 2,851,522 | 9/1958 | Hollywood | 178—7.3 |
| 2,968,766 | 1/1961 | Horowitz | 328—223 |
| 3,030,440 | 4/1962 | Schade | |
| 3,153,207 | 10/1964 | Brown | 328—56 X |

FOREIGN PATENTS

| | | |
|---|---|---|
| 667,481 | 3/1952 | Great Britain. |

DONALD D. FORRER, Primary Examiner

S. D. MILLER, Assistant Examiner

U.S. Cl. X.R.

307—263; 328—56, 164